(12) United States Patent
Myhre

(10) Patent No.: US 6,883,369 B1
(45) Date of Patent: Apr. 26, 2005

(54) SENSOR AND METHOD OF MEASURING MASS FLOW NON-INTRUSIVELY

(75) Inventor: Douglas C. Myhre, Eagan, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 0 days.

(21) Appl. No.: 10/839,846

(22) Filed: May 6, 2004

(51) Int. Cl.$^7$ ................................................. G01F 1/68
(52) U.S. Cl. ................................................. 73/204.12
(58) Field of Search ....................... 73/204.12, 204.14, 73/204.13, 202.5

(56) References Cited

U.S. PATENT DOCUMENTS

| | | | |
|---|---|---|---|
| 4,603,580 A | * | 8/1986 | Waring .......................... 73/295 |
| 4,781,057 A | * | 11/1988 | Hyfantis et al. .............. 73/49.2 |
| 4,949,578 A | * | 8/1990 | Harpster ...................... 73/202.5 |
| 6,487,904 B1 | | 12/2002 | Myhre |

* cited by examiner

Primary Examiner—Edward Lefkowitz
Assistant Examiner—Jewel Thompson
(74) Attorney, Agent, or Firm—Calfee, Halter & Griswold LLP; James M. Rashid, Esq.

(57) ABSTRACT

A non-intrusive sensor for measuring mass flow of a medium flowing through a tube comprises: a probe having a predetermined length disposed along an external wall of the tube; a heater for heating the probe at a first point along the length thereof; a first temperature measuring device disposed at the first point for measuring a temperature of the probe and for generating a first signal $T_h$ representative thereof; a second temperature measuring device disposed at a second point along the length of the probe for measuring another temperature of the probe and for generating a second signal $T_t$ representative thereof; a third temperature measuring device disposed along the external wall of the tube a distance away from the probe for measuring an ambient temperature and for generating a signal $T_a$ representative thereof; and circuitry coupled to the first, second and third temperature measuring devices for generating a mass flow signal based on a ratio of temperature differential signals $(T_h - T_a)/(T_t - T_a)$. A counterpart method is also disclosed.

20 Claims, 4 Drawing Sheets

| FLOW OUTPUT, V | FLOW, SLPM | OUTPUT, V | ESTIMATED VARIATION | ESTIMATED VARIATION, % | ESTIMATED VARIATION, %FS |
|---|---|---|---|---|---|
| 2.2 | 31.18 | 1.44 | 0.02 | 1.39 | 1.39 |
| 2.0 | 28.31 | 1.3 | 0.015 | 1.15 | 1.04 |
| 1.5 | 21.163 | 0.92 | 0.01 | 1.09 | 0.69 |
| 1.0 | 14.048 | 0.522 | 0.008 | 1.53 | 0.56 |
| 0.5 | 6.964 | 0.06531 | 0.005 | 7.66 | 0.35 |

SENSOR AND METHOD OF MEASURING MASS FLOW NON-INTRUSIVELY

BACKGROUND OF THE INVENTION

The present invention is related to mass flow sensors, in general, and more particularly, to a sensor and method of non-intrusively measuring mass flow of a medium flowing through a tube.

Intrusive mass flow sensors of the thermal type generally involve disposing a heated probe through a wall of the tube and into the flow stream of the medium. The mass flow is measured by virtue of its relation to the convection heat transfer coefficient that is related to the thermal gradient measured at two points along the length of the probe, preferably at the base and tip of the probe. One example of such an intrusive mass flow sensor is provided in the U.S. Pat. No. 6,487,904, issued Dec. 3, 2002, entitled "Method and Sensor For Mass Flow Measurement Using Probe Heat Conduction" and assigned to the same assignee as the instant application.

Some applications can not tolerate an intrusive sensor, i.e. a sensor which has at least one probe penetrating the wall of the flow tube. In addition, in those applications in which the power source may be limited, power consumption of a sensor probe in the flow stream may exceed the capacity of the power source. Moreover, disposing an intrusive probe into the flow stream will produce a pressure drop that may undesirably limit the flow of the medium through the tube.

Accordingly, what is desired is a non-intrusive alternative mass flow sensor and method that produces no pressure drop in the medium flow and functions with a low power consumption. The present invention offers such an alternative non-intrusive mass flow sensor and method.

SUMMARY OF THE INVENTION

In accordance with one aspect of the present invention, a non-intrusive sensor for measuring mass flow of a medium flowing through a tube comprises: a probe having a predetermined length disposed along an external wall of the tube; means for heating the probe at a first point along the length of the probe; a first temperature measuring device disposed at the first point for measuring a temperature of the probe and for generating a first signal $T_h$ representative thereof; a second temperature measuring device disposed at a second point along the length of the probe for measuring another temperature of the probe and for generating a second signal $T_t$ representative thereof; a third temperature measuring device disposed along the external wall of the tube a distance away from the probe for measuring an ambient temperature and for generating a signal $T_a$ representative thereof; and means coupled to the first, second and third temperature measuring devices for generating a mass flow signal based on a ratio of temperature differential signals $(T_h-T_a)/(T_t-T_a)$.

In accordance with another aspect of the present invention, a method of non-intrusively measuring mass flow of a medium flowing through a tube comprises the steps of: disposing a probe having a predetermined length along an external wall of the tube; heating the first probe at a first point along the length of the probe; measuring a temperature $T_h$ of the probe at the first point; measuring another temperature $T_t$ of the probe at a second point along the length of the probe; measuring an ambient temperature $T_a$ along the external wall of the tube a distance away from the probe; and measuring the mass flow based on a ratio of temperature differential measurements $(T_h-T_a)/(T_t-T_a)$.

DETAILED DESCRIPTION OF THE INVENTION

Figure 1:
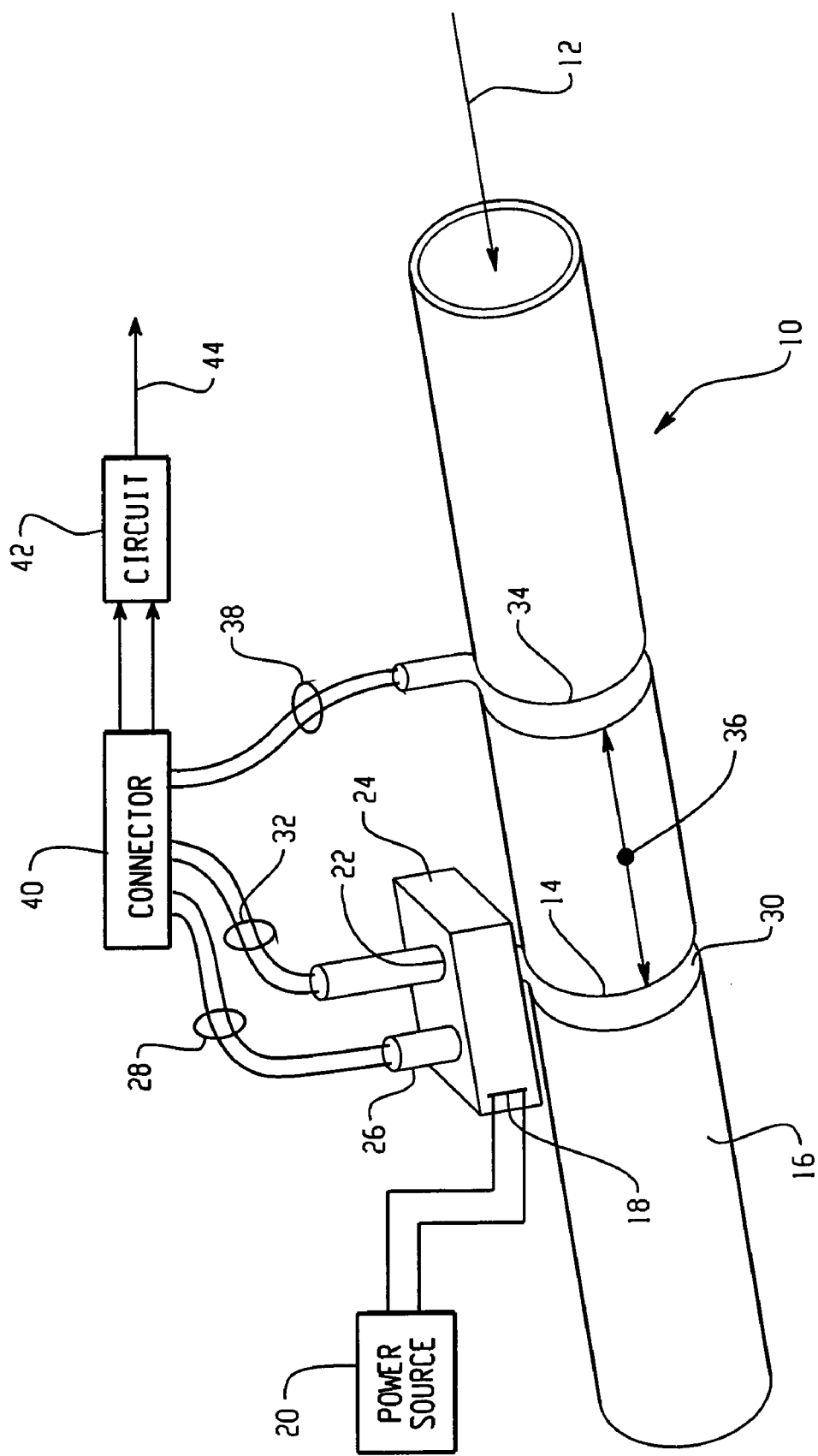
FIG. 1 is an illustration of an exemplary non-intrusive mass flow sensor suitable for embodying the principles of the present invention.

A non-intrusive mass flow sensor suitable for embodying the principles of the present invention is shown in the illustration of FIG. 1. Referring to FIG. 1, a flow tube 10 is provided to contain the flow of a medium, which may be a gas or a liquid, for example, therethrough in the direction of the arrow 12. In the present example, the flow tube 10 is made of stainless steel, but it is understood that the present invention will apply to other materials as well. A probe 14 having a predetermined length is disposed along an external wall 16 of the flow tube 10. In the present embodiment, the probe 14, which may be a metal sheathed thermocouple housing, for example, is wrapped about the circumference of the external wall 16. The probe 14 may be rendered in thermal contact with the external wall 16 by brazing the probe 14 to the wall 16, for example. It is understood that there may be other ways of rendering the probe 14 in thermal contact with the wall 16 without deviating from the broad principles of the present invention.

A heating element 18, which may be a Platinum resistive thermometer (PRT), for example, is powered by a power source 20 to heat ($I^2R$) the probe 14 at a first point 22 along the length thereof. In the present embodiment, the first point 22 is at one end or base of the probe 14. The heating element 18 may be embedded in a heat storage unit 24, which may be a heating block of Copper, for example, to provide a stabilization of the heating temperature at the first point 22. The heating block 24 is thermally coupled to the base 22 of the probe 14 and may be insulated from the outside temperature to reduce heat losses. A first temperature measuring device 26, which may be a thermocouple, for example, is thermally coupled to heating block 24 to measure the temperature $T_h$ at the first point 22 of the probe 14 and generate a signal over wires 28 representative thereof.

A second temperature sensing device, like a thermocouple, for example, may be disposed at a second point 30 within and along the length of the probe 14 to measure the temperature $T_t$ of the probe at the second point and generate a signal over wires 32 representative thereof. Preferably, the second temperature sensing device is disposed at the tip of the probe 14 which is at a substantial distance from the base thereof. A third temperature measuring device 34 is disposed along the external wall 16 of the tube 10 a distance 36 away from the probe 14 for measuring an ambient temperature $T_a$. The distance 36 may be on the order of twice the diameter of the tube 10, for example. The third temperature measuring device may comprise a metal sheathed thermocouple housing, for example, wrapped about the circumference of the external wall 16, and a thermocouple disposed in the housing for measuring the ambient temperature $T_a$ and generating a signal over wires 38 representative thereof. The thermocouple housing 34 may be rendered in thermal contact with the wall 16 by brazing, for example.

The wire pairs 28, 32 and 38 from the first, second and third thermocouples, respectively, may be provided to a connector or connecting terminals 40 wherein the wires may be coupled together to provide differential temperature signals $T_h-T_a$ and $T_t-T_a$ as will become more evident from the following description. The signals $T_h-T_a$ and $T_t-T_a$ are provided to circuitry 42 for generating a mass flow signal 44 based on a ratio of the differential temperature signals $(T_h-T_a)/(T_t-T_a)$. An exemplary circuit embodiment suitable for use as the circuitry elements 40 and 42 in the embodiment of FIG. 1 is shown in FIG. 5.

Figure 5:
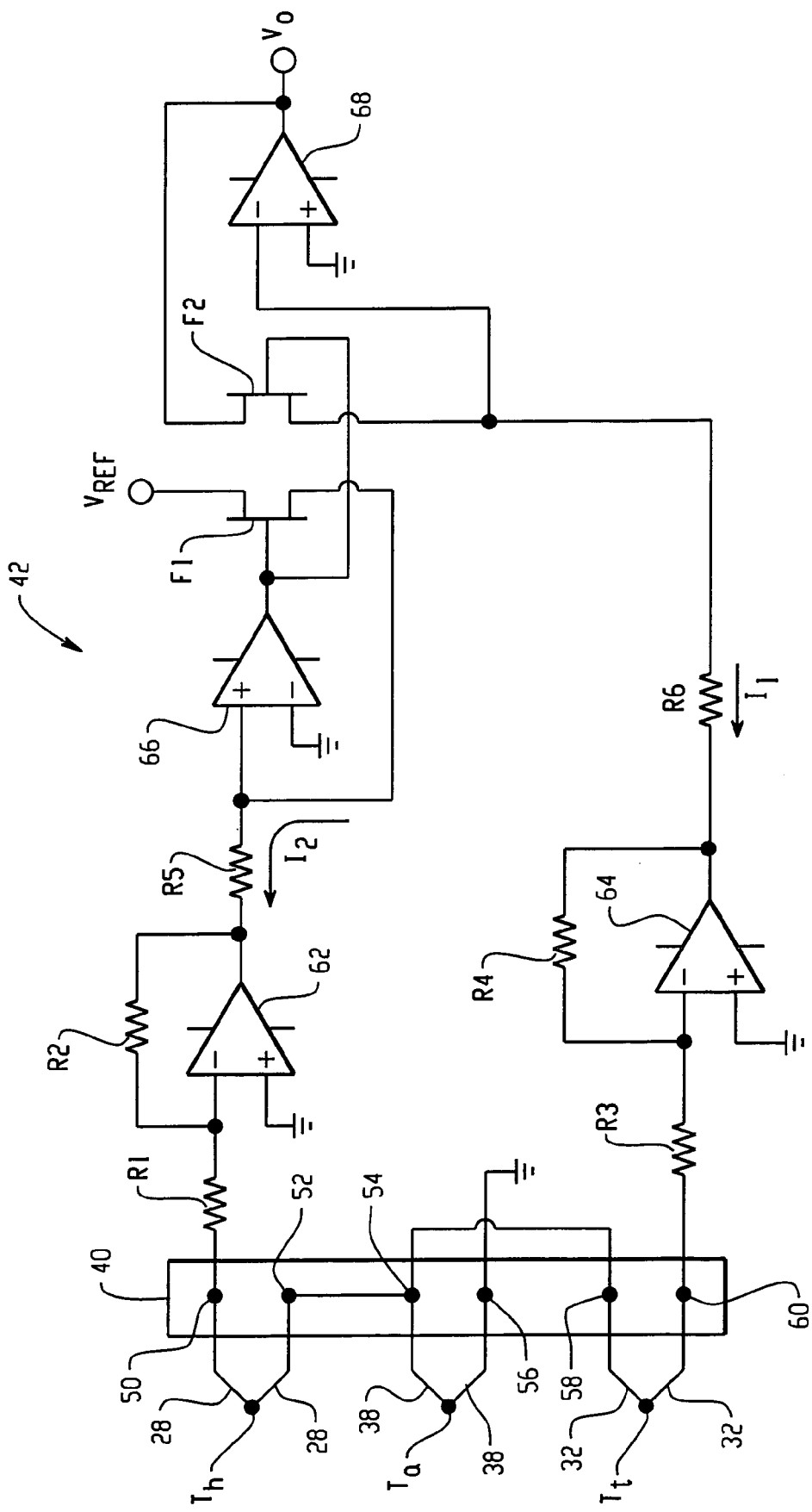
FIG. 5 is a schematic diagram of exemplary circuitry for use in the embodiment of FIG. 1 for determining mass flow.

Referring to FIG. 5, wires 28 of the thermocouple measuring the temperature $T_h$ and connected to terminals 50 and 52 of the interconnection box 40; wires 38 of the thermocouple measuring the temperature $T_a$ are connected to terminals 54 and 56 of the box 40; and wires 32 of the thermocouple measuring the temperature $T_t$ are connected to terminals 58 and 60 of the box 40. One interconnecting terminal 56 of thermocouple $T_a$ is connected to a ground or common potential of the circuit 42 and the other interconnecting terminal 54 of $T_a$ is jumpered to the terminal 54 of thermocouple $T_h$ in such a manner to create the temperature differential signal $T_h-T_a$ at the terminal 50. The other interconnecting terminal 54 of $T_a$ is also jumpered to the terminal 58 of thermocouple $T_t$ in such a manner to create the temperature differential signal $T_t-T_a$ at the terminal 60.

Terminal 50 is coupled to an inverting amplifier circuit 62 with a closed-loop gain of approximately 100. The circuit 62 comprises an operational amplifier, which may be a OP200, for example, input resister R1 (1 KΩ) and feedback resister R2 (100 KΩ). Similarly, terminal 60 is coupled to an inverting amplifier circuit 64 also with a closed-loop gain of approximately 100. The circuit 64 comprises an operational amplifier, which may be a OP200, for example, input resister R3 (1 KΩ) and feedback resister R4 (100 KΩ). The outputs of amplifiers 62 and 64 are coupled to a dual matched field effect transistor (FET) pair and dual operational amplifier circuit configuration to produce the mass flow signal $V_o$ based on the ratio of temperature differential signals $(T_h-T_a)/(T_t-T_a)$.

More specifically, the output of amplifier 62 is coupled through a resistor R5 (10 KΩ) to a non-inverting (+) input of an operational amplifier 66, which may be a OP200, for example, and to the drain of one F1 of the matched pair of FETs (F1, F2), which may be a 2N5912, for example. The (+) input of amplifier 66 is at virtual circuit ground. The output of amplifier 66 is coupled to and drives the gates of the pair of FETs F1 and F2. The source of F1 is coupled to a reference voltage. Accordingly, the drain or channel current I2 of F1 is proportional to the temperature differential signal $T_h-T_a$. Similarly, the output of amplifier 64 is coupled through a resistor R6 (10 KΩ) to the drain of the other F2 of the pair of FETs F1 and F2 and also to an inverting (−) input of another operational amplifier 68. The (−) input of amplifier 68 is at virtual circuit ground. The FET F2 is coupled source-to-drain across the amplifier 68 output-to-(−) input. Thus, the channel current I1 of F2 is proportional to the temperature differential signal $T_t-T_a$. Based on the foregoing described circuit configuration, the output voltage $V_o$ of amplifier 68 representative of the mass flow is equal to (I2/I1) $V_{ref}$ which is proportional to the ratio of the temperature differentials $(T_h-T_a)/(T_t-T_a)$.

While the present circuitry embodiment is described with analog circuit elements, it is understood that the individual temperature measurement signals $T_h$, $T_a$, and $T_t$ may be digitized and processed by a microcontroller system to determine mass flow therefrom just as well. An exemplary microcontroller system for this purpose has been described in the above-referenced issued U.S. Pat. No. 6,487,904 which is incorporated by reference herein for providing greater details of structure and operation thereof.

Since the probe 14 is brazed along and thus, in thermal contact with the external wall 16 of the flow tube 10, heat from the probe 14 is transferred through the wall 16 to the medium flowing through the tube 10. Accordingly, as the medium flow increases, the amount of heat that is transferred through the wall 16 increases and more heat is removed from the probe 14. Under these conditions, $T_t$ drops relative to $T_h$. Likewise, as the medium flow decreases, $T_t$ increases relative to $T_h$. Note that in the present embodiment, $T_h$ is not held constant and permitted to vary so long as the temperatures $T_t$ and $T_h$ are both compensated for the ambient temperature $T_a$ in the ratio thereof. In addition, the separation of the thermocouple measurements $T_h$ and $T_t$ along the length of the probe 14 is dependent on many factors such as the heat flux of the medium, the material of the tube, the heat conduction of the probe and the like, for example.

Figures 2, 3:
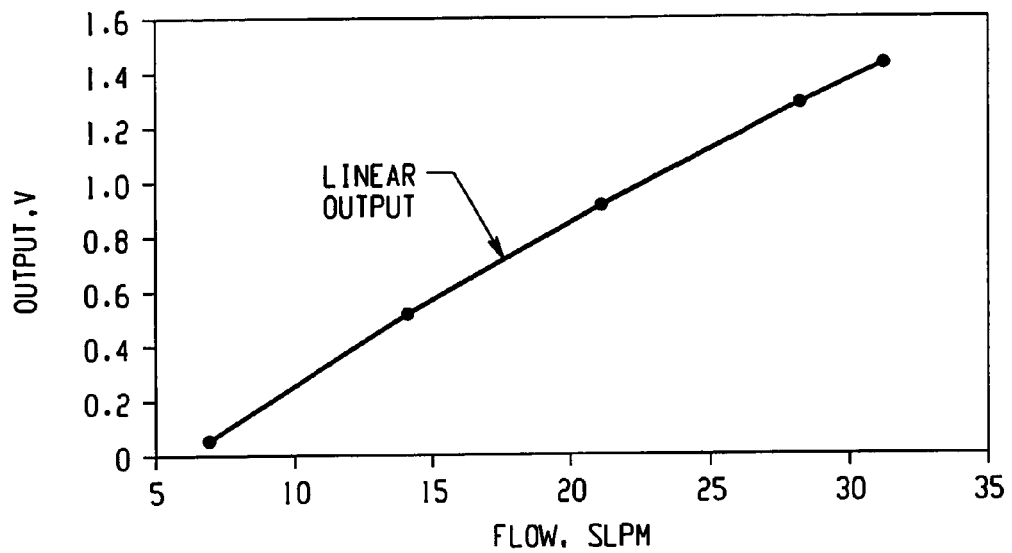
FIG. 2 is a graph of test results of the exemplary mass flow sensor embodiment.
FIG. 3 is a table listing the test results of the exemplary mass flow sensor embodiment.

Tests were conducted on the present embodiment under the following conditions. Thermocouple housings 14 and 34 were silver brazed to the external wall 16 of flow tube 10 which was one-quarter inch diameter stainless steel. Nitrogen gas was used as the medium at room temperature behind 100 psia pressure. The heating element was two PRTs configured in parallel to produce a heater resistance of 74.6 Ω at room temperature which was driven by a current of 134 ma. A standard flow sensor comprising a critical orifice type device was used to measure the actual medium flow settings in standard liters per minute (slpm). Mass flow readings in the form of volts were recorded for each setting. The test results for five exemplary flow settings are listed in the Table of FIG. 3 and plotted as black dots in the graph of FIG. 2. Referring to the table of FIG. 3, moving from left to right, the first and second columns represent the output of the standard flow sensor in volts and slpm, respectively. The third column from left to right represents the output $V_0$ of the embodiment under test. The last three columns represent a comparison between the standard flow readings and flow readings from the embodiment under test. The test plot of FIG. 2 yielded a linear function approximated by the expression: Y=0.0565X−0.2987, with a correlation value $R^2$ of 0.9979.

Figure 4:
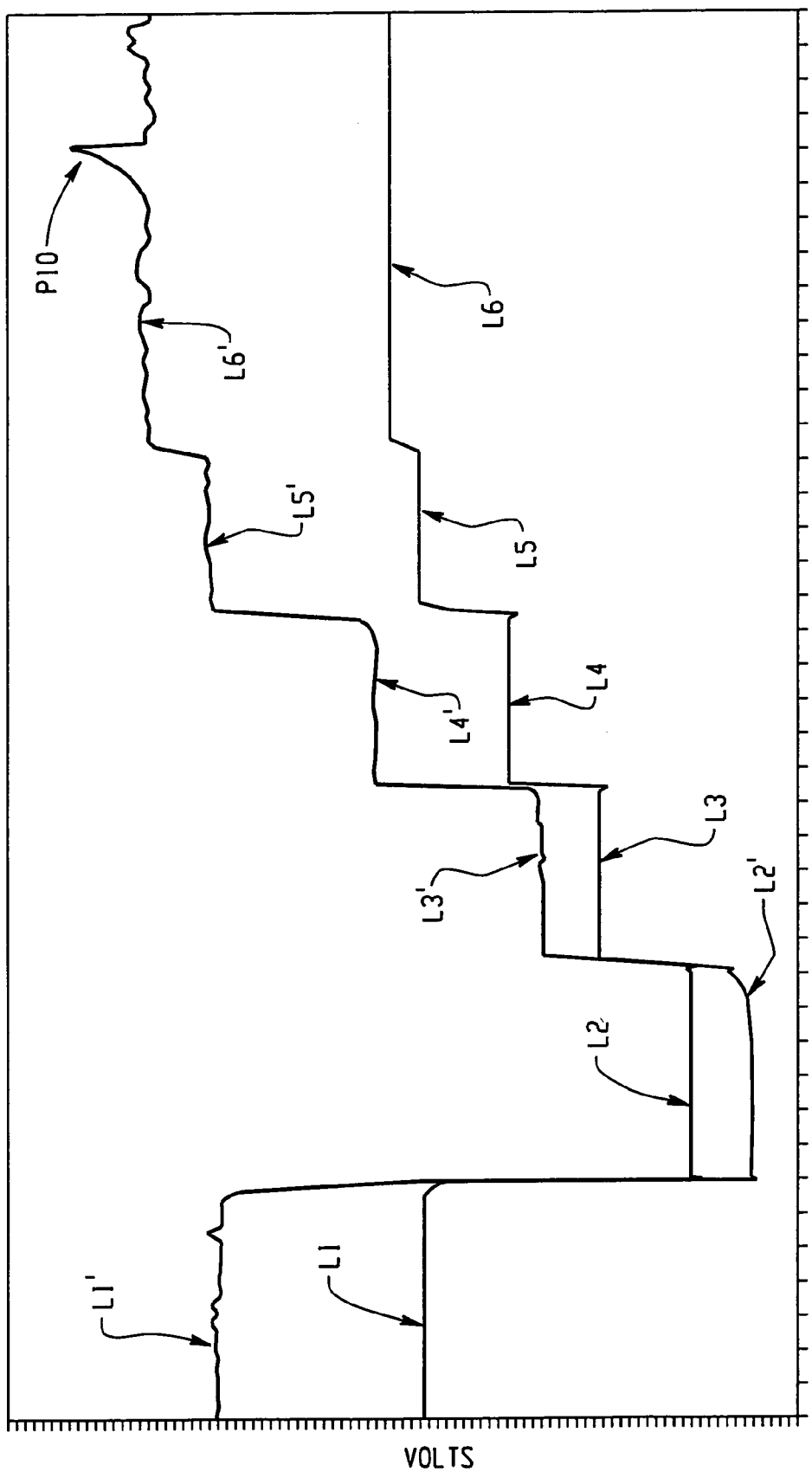
FIG. 4 is a time graph exemplifying response characteristics of the of the exemplary mass flow sensor embodiment.

Tests were also conducted to compare the time response of the present embodiment (test sensor) with that of the standard flow sensor. FIG. 4 is a time graph exemplifying a comparison of such time responses. Referring to FIG. 4, the ordinate is a measure of the output voltage of each of the sensors, which voltage being representative of flow in slpm, and each increment of the abscissa represents a minute in time. During the exemplary response test recorded in FIG. 4, the flow was changed to six different levels over a period of time and the output voltages of the standard and test sensors were time recorded.

In FIG. 4, the time response curves of the standard and test flow sensors are represented by the voltage output levels L1–L6 and L1'–L6', respectively. In the present example, levels L1–L6 of the standard flow sensor correspond to voltages and flows as follows: 2.0 volts (28.31 slpm), 0.50 volts (6.964 slpm), 1.0 volt (14.05 slpm), 1.5 volts (21.16 slpm), 2.0 volts (28.31 slpm), and 2.2 volts (31.18 slpm).

Also, levels L1'–L6' of the test flow sensor correspond to voltages as follows: 1.3 volts, 0.065 volts, 0.52 volts, 0.92 volts, 1.3 volts, and 1.44 volts. Note that the test sensor responds just as well as the standard sensor to the changes in flow. At point P10 in FIG. 4, the heater voltage of the test sensor was changed from 7 to 10 volts to determine how long it would take for the test sensor to recover. In the present example, the test sensor recovered in about one minute.

The non-intrusive sensor of the present embodiment results in no pressure drop in the medium other than the pressure drop of the flow tube itself. Also, the sensor functions with a low power consumption since the only elements being heated are the heater block (which may be thermally isolated) and the probe thermocouple housing and heat transfer to the flow tube is very limited. The reason for this is because the heat generated by the heater is enough to keep the heating block above the temperature of the fluid and heat losses may be controlled by insulating the heating block from the outside temperature and designing the conduction path to the $T_t$ sensor to be a minimum to obtain a good signal. Accordingly, the heat loss is used substantially for the measurement.

While the present invention has been described herein above in connection with one or more embodiments, it is understood that such description was presented solely by way of example. Accordingly, there is no intention of limiting the invention in any way to an exemplary embodiment. Rather, the present invention should be construed in breadth and broad scope in accordance with the recitation of the claims appended hereto.

What is claimed is:

1. A non-intrusive sensor for measuring mass flow of a medium flowing through a tube, said sensor comprising:
    a probe having a predetermined length disposed along an external wall of said tube;
    means for heating said probe at a first point along the length of said probe;
    a first temperature measuring device disposed at said first point for measuring a temperature of said probe and for generating a first signal $T_h$ representative thereof;
    a second temperature measuring device disposed at a second point along the length of said probe for measuring another temperature of said probe and for generating a second signal $T_t$ representative thereof;
    a third temperature measuring device disposed along the external wall of said tube a distance away from said probe for measuring an ambient temperature and for generating a signal $T_a$ representative thereof; and
    means coupled to said first, second and third temperature measuring devices for generating a mass flow signal based on a ratio of temperature differential signals $(T_h-T_a)/(T_t-T_a)$.

2. The sensor of claim 1 wherein the probe is wrapped about the circumference of the external wall of the tube and in thermal contact therewith.

3. The sensor of claim 2 wherein the first point is in proximity to one end of the probe and the second point is along the length of said probe separated substantially from said one end.

4. The sensor of claim 1 wherein the heating means comprises a heating element in thermal contact with the probe at the first point.

5. The sensor of claim 1 wherein the heating means comprises: a heat storage unit in thermal contact with the probe at the first point; and a heater element for applying heat energy to said heat storage unit.

6. The sensor of claim 1 wherein the first, second and third temperature measuring devices are coupled together to provide differential temperature signals $T_h-T_a$ and $T_t-T_a$.

7. The sensor of claim 1 wherein each of the first, second and third temperature measuring devices comprise a thermocouple.

8. The sensor of claim 1 wherein the probe comprises a metal sheathed thermocouple housing wrapped about the circumference of the external wall of the tube and in thermal contact therewith; and wherein the second temperature measuring device comprises a thermocouple disposed in said thermocouple housing.

9. The sensor of claim 1 wherein the third temperature measuring device comprises: a metal sheathed thermocouple housing wrapped about the circumference of the external wall of the tube and in thermal contact therewith; and a thermocouple disposed in said thermocouple housing.

10. The sensor of claim 1 wherein the generating means comprises analog processing circuitry.

11. A method of non-intrusively measuring mass flow of a medium flowing through a tube, said method comprising the steps of:
    disposing a probe having a predetermined length along an external wall of said tube;
    heating said first probe at a first point along the length of said probe;
    measuring a temperature $T_h$ of said probe at said first point;
    measuring another temperature $T_t$ of said probe at a second point along the length of said probe;
    measuring an ambient temperature $T_a$ along the external wall of said tube a distance away from said probe; and
    measuring said mass flow based on a ratio of temperature differential measurements $(T_h-T_a)/(T_t-T_a)$.

12. The method of claim 11 including the steps of: wrapping the probe about the circumference of the external wall of the tube; and rendering the probe in thermal contact with the external wall.

13. The method of claim 12 including separating the second point a substantial distance from the first point along the length of the probe.

14. The method of claim 11 wherein the step of heating includes disposing a heating element in thermal contact with the probe at the first point.

15. The method of claim 11 wherein the step of heating includes: disposing a heat storage unit in thermal contact with the probe at the first point; and applying heat energy to said heat storage unit.

16. The method of claim 11 wherein the step of measuring mass flow includes providing differential temperature measurements $T_h-T_a$ and $T_t-T_a$.

17. The method of claim 16 wherein the step of measuring mass flow includes analog processing of the differential temperature measurements $T_h-T_a$ and $T_t-T_a$ to render the ratio of temperature differential measurements $(T_h-T_a)/(T_t-T_a)$.

18. The method of claim 11 wherein the step of disposing the probe comprises: wrapping a metal sheathed thermocouple housing about the circumference of the external wall of the tube and rendering said housing in thermal contact with the external wall; and wherein the temperature $T_t$ is measured within said thermocouple housing.

19. The method of claim 11 wherein the step of measuring the temperature $T_a$ comprises:

wrapping a metal sheathed thermocouple housing about the circumference of the external wall of the tube and rendering said housing in thermal contact with the external wall; and wherein the temperature $T_a$ is measured within said thermocouple housing.

20. A non-intrusive sensor for measuring mass flow of a medium flowing through a tube, said sensor comprising:

a thermocouple housing having a predetermined length wrapped about a circumference of an external wall of said tube and in thermal contact therewith;

a heating element disposed at one end of said housing for applying heat to said housing;

a first thermocouple disposed at said one end for measuring a temperature $T_h$ of said housing at said one end;

a second thermocouple disposed at a point along the length of said housing for measuring a temperature $T_t$ of said housing at said point;

a third thermocouple disposed along the external wall of said tube a distance away from said housing for measuring an ambient temperature $T_a$;

wherein the first, second and third thermocouples being interconnected to effect temperature differential measurement signals $(T_h-T_a)$ and $(T_t-T_a)$; and analog circuitry coupled to said temperature differential measurement signals for generating a mass flow signal based on a ratio of temperature differential signals $(T_h-T_a)/(T_t-T_a)$.

* * * * *